United States Patent
Chapman et al.

(10) Patent No.: US 10,866,325 B1
(45) Date of Patent: Dec. 15, 2020

(54) SATELLITE POSITIONING SYSTEM RECEIVERS WITH MICROELECTROMECHANICAL SYSTEMS OSCILLATORS

(71) Applicant: Interstate Electronics Corporation, Anaheim, CA (US)

(72) Inventors: David Duane Chapman, Fountain Valley, CA (US); Steven B. Alexander, Orange, CA (US)

(73) Assignee: Interstate Electronics Corporation, Anaheim, CA (US)

( * ) Notice: Subject to any disclaimer, the term of this patent is extended or adjusted under 35 U.S.C. 154(b) by 240 days.

(21) Appl. No.: 16/038,747

(22) Filed: Jul. 18, 2018

Related U.S. Application Data

(63) Continuation of application No. 15/057,858, filed on Mar. 1, 2016, now Pat. No. 10,107,919.

(51) Int. Cl.
*G01S 19/37* (2010.01)

(52) U.S. Cl.
CPC ................................ *G01S 19/37* (2013.01)

(58) Field of Classification Search
CPC .............................. G01S 19/35; G01S 19/37
USPC ............................................... 342/357.77
See application file for complete search history.

(56) References Cited

U.S. PATENT DOCUMENTS

| | | | |
|---|---|---|---|
| 7,274,504 B2 | 9/2007 | Crane et al. | |
| 7,429,904 B2 | 9/2008 | Trutna, Jr. et al. | |
| 7,471,238 B2 | 12/2008 | Lillo | |
| 7,852,711 B1 | 12/2010 | Fitzgerald et al. | |
| 7,916,070 B2 * | 3/2011 | Alexander | 342/357.3 |
| 8,013,789 B2 | 9/2011 | van Graas | |

(Continued)

OTHER PUBLICATIONS

Electronic Design Staff; MEMS Oscillator Plus Tiny Gps Receiver Create Ultra-Mini Tracking Device; Dec. 30, 2013; retrieved from the Internet <URL: http://electronicdesign.com/components/mems-oscillator-plus-tiny-gps-receiver-create-ultra-mini-tracking-device>; retrieved on May 7, 2015.

(Continued)

*Primary Examiner* — Erin F Heard
*Assistant Examiner* — Michael W Justice
(74) *Attorney, Agent, or Firm* — Knobbe, Martens, Olson & Bear LLP

(57) ABSTRACT

Apparatus and methods permit the use of a microelectromechanical systems (MEMS) oscillator in a satellite positioning system receiver, such as a Global Positioning System (GPS) receiver. Techniques to ameliorate jitter or phase noise disadvantages associated with MEMS oscillators are disclosed. For example, a receiver can use one or more of the following techniques: (a) use another source of information to retrieve ephemeris information, (2) perform advanced tight coupling, and/or (3) use a phase-locked loop to clean up the jitter or phase noise of the MEMS oscillator. With respect to advanced tight coupling, an advanced tight coupling processor can include nonlinear discriminators which transform I and Q data into linear residual measurements corrupted by unbiased, additive, and white noise. It also includes an amplitude estimator configured to operate in rapidly changing, high power noise; a measurement noise variance estimator; and a linear residual smoothing filter for input to the navigation filter.

18 Claims, 5 Drawing Sheets

(56) References Cited

U.S. PATENT DOCUMENTS

| | | | |
|---|---|---|---|
| 8,183,944 | B2 | 5/2012 | Seeger |
| 8,570,112 | B2 | 10/2013 | Yamakawa et al. |
| 8,745,430 | B2* | 6/2014 | Cornelius ............... G06F 1/12 |
| | | | 713/400 |
| 8,803,624 | B2 | 8/2014 | Phan Le |
| 8,909,188 | B2 | 12/2014 | Collier |
| 9,118,334 | B2 | 8/2015 | Schlarmann |
| 9,300,354 | B2 | 3/2016 | Floch |
| 9,490,826 | B1* | 11/2016 | Wang ..................... H03L 7/909 |
| 9,520,886 | B2 | 12/2016 | Dionne |
| 9,640,531 | B1 | 5/2017 | Or-Bach |
| 2007/0205940 | A1* | 9/2007 | Yang ........................ G01S 5/14 |
| | | | 342/357.12 |
| 2012/0043999 | A1 | 2/2012 | Quevy et al. |
| 2012/0074818 | A1 | 3/2012 | Crowley et al. |
| 2014/0378171 | A1* | 12/2014 | Rudow ................... H04W 4/02 |
| | | | 4/2 |

OTHER PUBLICATIONS

Evans-Pughe, Christine; Oscillators—The New Wave; Engineering and Technology Magazine vol. 7, Issue 10; Oct. 22, 2012; retrieved from the Internet <URL: http://eandt.theiet.org/magazine/2012/10/oscillators-new-wave.cfm >; retrieved on May 7, 2015.

Navy SBIR 2015.2—Topic N152-112; Robust MEMs Oscillator Replacement for Quartz Crystal TCXO Oscillator; retrieved from the Internet <URL: http://www.zyn.com/sbir/sbres/sbir/dod/navy/n152-112.htm>; retrieved on May 7, 2015.

Schweber, Bill; MEMS Poised to Disrupt Another Long-Established Market: Crystal Oscillators; IHS Electronics360; May 13, 2013; retrieved from the Internet <URL: http://electronics360.globalspec.com/article/148/mems-poised-to-disrupt-another-long-established-market-crystal-oscillators>; retrieved on May 7, 2015.

Sitime; World's Smallest CSP MEMS Oscillator from SiTime Paired with Mini GPS Receiver from Telit to Enable New Wave of Ultra-Miniature Tracking and Navigation Devices; Dec. 18, 2013; retrieved from the Internet <URL: http://www.sitime.com/news/488-worlds-smallest-csp-mems-oscillator-from-sitime-paired-with-mini-gps-receiver-from-telit-to-enable-new-wave-of-ultra-miniature-tracking-and-navigation-devices >; retrieved on May 7, 2015.

Wireless Design & Development Staff; CSP MEMS Oscillator Paired with Mini GPS Receiver; Jan. 9, 2014; retrieved from the Internet <URL: http://www.wirelessdesignmag.com/product-releases/2014/01/csp-mems-oscillator-paired-mini-gps-receiver>; retrieved on May 7, 2015.

\* cited by examiner

US 10,866,325 B1

SATELLITE POSITIONING SYSTEM RECEIVERS WITH MICROELECTROMECHANICAL SYSTEMS OSCILLATORS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The invention generally relates to satellite positioning systems, such as GPS. In particular, the invention relates to receivers for satellite positioning systems utilizing MEMS oscillators.

Description of the Related Art

A typical receiver for a satellite positioning system receiver such as a global positioning system (GPS) receiver uses a relatively expensive quartz crystal oscillator, such as a heated crystal oscillator or a temperature compensated crystal oscillator (TCXO). While MEMS oscillators are desirably cheaper than crystal oscillators, the implementation of a GPS receiver using a MEMS oscillator has been to be difficult to achieve due to the higher phase noise characteristics of MEMS oscillators.

SUMMARY

One embodiment includes a global positioning satellite (GPS) receiver including: a microelectromechanical systems (MEMS) oscillator configured to generate a first clock signal as an output; a frequency synthesizer configured to receive the first clock signal from the MEMS oscillator as an input and configured to generate a local oscillator signal as an output; a downconverter configured to downconvert one or more received radio frequency (RF) signals using the local oscillator signal to generate an intermediate frequency (IF) signal; an analog-to-digital converter configured to receive the IF signal and generate a digital IF signal; a plurality of channel signal processors configured to despread GPS signals from the digital IF signal and generate pseudo-range estimates to space vehicles, wherein a channel signal processor of the plurality of channel signal processors comprises a carrier numerically controlled oscillator (NCO) and a code NCO, wherein the carrier NCO and the clock NCO are configured to receive an NCO clock signal based on the first clock signal from the MEMS oscillator as an input; and a navigation processor configured to extract at least position information based at least on the plurality of pseudo-range estimates.

One embodiment includes a global positioning satellite (GPS) receiver including: a microelectromechanical systems (MEMS) oscillator configured to generate a first clock signal as an output; a phase-locked loop configured to receive the first clock signal as an input, and to generate an NCO clock signal as an output, wherein the NCO clock signal has less phase noise relative to the first clock signal; and a plurality of channel signal processors configured to despread GPS signals and configured to generate pseudo-range estimates to space vehicles, wherein a channel signal processor of the plurality of channel signal processors comprises at least one numerically controlled oscillator (NCO), wherein the at least one NCO is configured to receive the NCO clock signal; and a navigation processor configured to extract at least position information based at least on the plurality of pseudo-range estimates.

BRIEF DESCRIPTION OF THE DRAWINGS

These drawings and the associated description herein are provided to illustrate specific embodiments of the invention and are not intended to be limiting.

To avoid repetition of description, components having the same or similar function may be referenced by the same reference number.

DETAILED DESCRIPTION OF EMBODIMENTS

Embodiments of the invention advantageously integrate a microelectromechanical systems (MEMS) oscillator with a receiver for a global navigation satellite system (GNSS), such as a receiver for the NAVSTAR Global Positioning System (GPS).

It can be relatively difficult to integrate a MEMS oscillator into a GPS receiver. Compared to conventional crystal oscillators, MEMS oscillators can have relatively large amounts of jitter and/or phase noise, and can be relatively sensitive to temperature.

For example, these characteristics can make it difficult for a GPS to successfully decode the navigation message from GPS signals. The jitter and/or phase noise can affect the available operating states of a GPS receiver. There are 7 possible operating states for a GPS receiver that are understood by one having ordinary skill in the art. The two operating states of interest in this disclosure are states 3 and 5. In state 3, a GPS receiver can maintain code lock, but cannot maintain carrier tracking. In state 3, pseudorange measurements will not have full accuracy. In state 5, a GPS receiver is able to track the carrier precisely and demodulate data, such as the navigation message. Without the navigation message, information carried by the navigation message, such as ephemeris parameters, time parameters, and clock offsets may not be available to the GPS receiver. In some prior art systems, a MEMS oscillator is used to track time such as when a GPS receiver is not operating in an active GPS state, such as when turned off or hibernating, to save power. Embodiments disclosed herein use a MEMS oscillator to generate oscillator signals for operation in at least one of states 3 or 5.

While illustrated in the context of the NAVSTAR Global Positioning System (GPS), the principles and advantages described herein are applicable to other GNSS, such as, but not limited to, the Russian GLONASS system, the European Galileo system, the Chinese COMPASS system, the Indian IRNSS system, or the like. Although particular embodiments are described herein, other embodiments of the invention, including embodiments that do not provide all of the benefits and features set forth herein, will be apparent to those of ordinary skill in the art.

Figure 1:
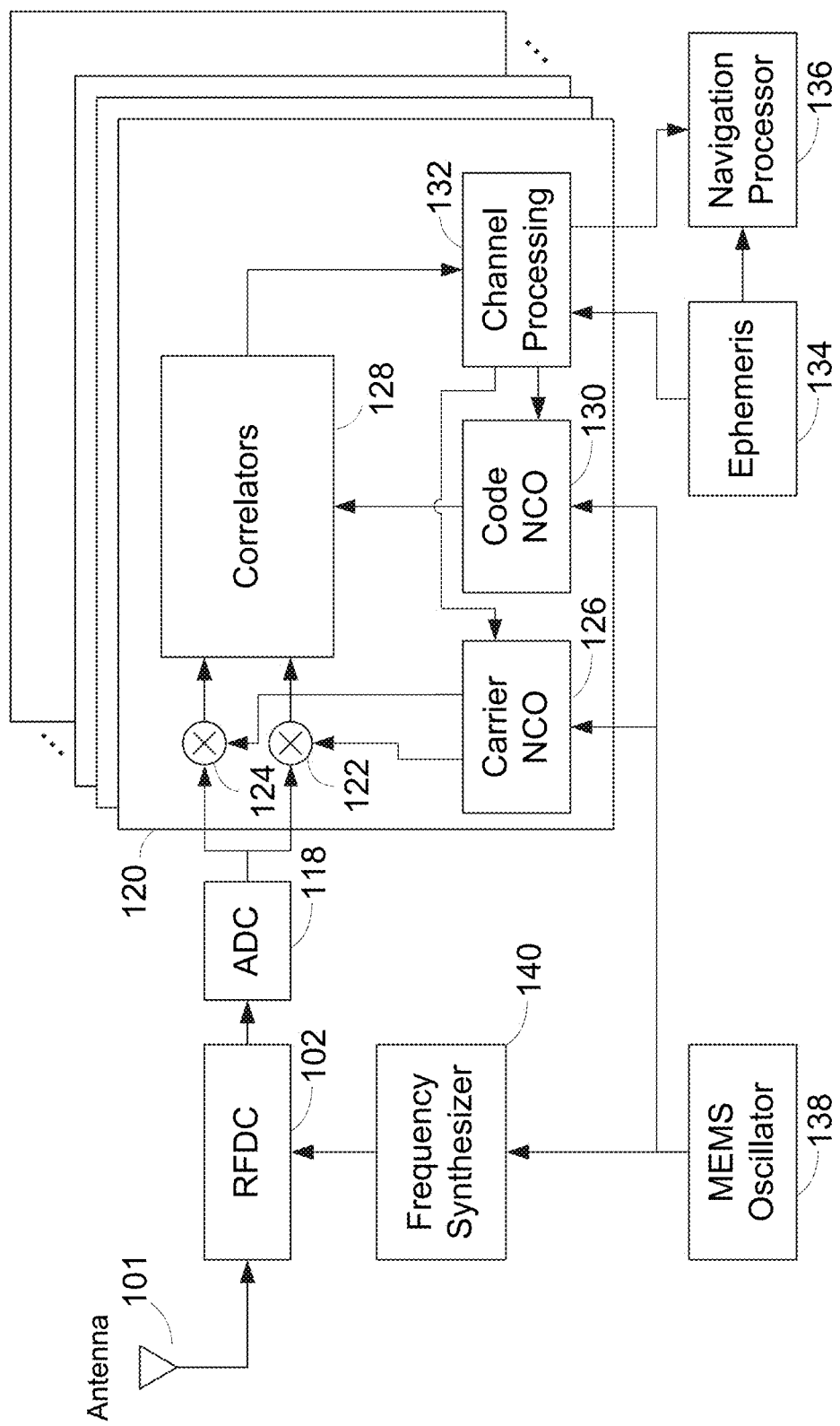
FIG. 1 illustrates an example of a GPS receiver with a MEMS oscillator.

FIG. 1 illustrates an example of a GPS receiver with a MEMS oscillator 138. For clarity, standard components such as filters and low noise amplifiers are not shown in FIG. 1. The GPS receiver uses an antenna 101 to receive radio frequency signals from GPS space vehicles, and the GPS receiver uses determines at least position information from the received RF signals. The illustrated GPS receiver includes a radio frequency down converter (RFDC) 102, an analog to digital converter (ADC) 118, a plurality of channel signal processors 120, an ephermeris data store 134, a navigation processor 136, a microelectromechanical systems (MEMS) oscillator 138, and a frequency synthesizer 140. In certain embodiments, the receiver can include a beamformer.

The signals from the antenna 101 are provided as inputs to a front-end of the receiver, which can include the RFDC 102. Other components of a typical front end, such as filters and low noise amplifiers, can be considered to be part of the RFDC 102. To perform downconverting, the RFDC 102 mixes one or more received radio frequency (RF) or GPS signals using a local oscillator (LO) signal from the frequency synthesizer 140 to generate an intermediate frequency (IF) signal, which is a composite signal.

The analog-to-digital converter 118 receives the IF signal as an input and generates a digital IF signal as an output. The digital IF signal is provided as inputs to the plurality of channel signal processors 120, an example of one of which is shown in FIG. 1 in greater detail. For example, a channel signal processor of the plurality of channel signal processors 120 can include a first mixer 122 for an in-phase component of the digital IF signal, a second mixer 124 for a quadrature-phase component of the digital IF signal, correlators or digital matched filters 128, a channel processing block 132, a code numerically controlled oscillator (NCO) 130, and a carrier numerically controlled oscillator (NCO) 126. A particular channel signal processor of the plurality is dedicated to acquiring and tracking a particular GPS code from a particular space vehicle. For example, a GPS space vehicle can transmit a coarse acquisition (C/A) code, a precise (P(Y)) code, and possibly other codes, such as a military (M) code. GPS receivers intended for consumer applications will typically have only channel signal processors for the C/A code. GPS receivers intended for consumer applications will typically have channel signal processors for at least both the C/A code and the precise code.

The plurality of channel signal processors 120 acquire and track GPS signals from the IF signal and generate pseudo-range estimates to space vehicles. A GPS receiver uses the pseudo-range estimates together with other information to generate, for example, at least one of time, positioning information, velocity, acceleration, and the like.

The carrier NCO 126 generates a local oscillator signal, which is converted into a first phase and a second phase (for example, sine and cosine) for mixing. A lookup table can be used to generate the sine and cosine waveforms. The first mixer 122 mixes the digital IF signal with the first phase from the carrier NCO 126 to generate an in-phase component of the GPS signal, and the second mixer 124 mixes the digital IF signal with the second phase from the carrier NCO 126 to generate a quadrature-phase component of the GPS signal. The in-phase component and the quadrature-phase components are then provided as inputs to the correlators 128. In one typical arrangement, 3 correlators are used for each code to detect early, late, and on-time tracking. The code chips from the in-phase component and the code chips from the quadrature-phase are multiplied and integrated within the correlators 128 by code chips of a replica code at a rate determined by the code NCO 130. The replica code varies among the space vehicles. The correlators 128 are used to acquire and track the GPS signals. The channel processing block 132 controls the code and carrier NCOs 130, 126 for tracking and acquisition.

After a GPS signal has been acquired and is being tracked, pseudo-range and pseudo-range rates between the receiver and the space vehicle can be determined, and can be provided as outputs of the channel processing block 132.

In the illustrated embodiment, the code and carrier NCOs 130, 126 and the frequency synthesizer 140 are driven by a clock signal from the MEMS oscillator 138. In many GPS architectures, the phase noise or jitter and the temperature instability of a MEMS oscillator 138 is so high that a GPS signal cannot be reliably acquired or tracked. Thus, a conventional GPS receiver will typically use a relatively expensive crystal oscillator, such as a heated crystal oscillator or a temperature compensated crystal oscillator (TCXO), instead of a MEMS oscillator. However, several advantages of MEMS oscillators exist. For example, a MEMS oscillator can be fabricated with other silicon devices, such as silicon used for electronics or for an inertial measurement system, which can provide a cost advantage over a crystal oscillator, which is typically fabricated off-chip. MEMS oscillators can also be more immune to relatively high g-forces, such as those encountered with artillery projectiles, electromagnetic projectiles, or the like. MEMS oscillator can be advantageously used in a GPS receiver used for guidance of any precision guided munition or to kits for adding guidance to munitions, such as a guided artillery shell, guided electromagnetic projectile (rail gun round), guided mortar rounds, guided missiles, smart bombs, or the like. An example of a smart bomb kit is the Joint Direct Attack Munition or JDAM.

A function performed by many typical GPS receivers is to decode the navigation message from the GPS signals. The navigation message carries information needed for determining positioning based on the GPS signals. For example, the navigation message carries the ephemeris parameters, which describe the coordinates of the particular space vehicle. The navigation message also carries time parameters, clock corrections, service parameters, an ionospheric parameters model, and almanacs, which can be useful to successful determination of position of the GPS receiver. One problem that was recognized by the inventors is that while certain GPS receiver architectures may be able to track and acquire a GPS signal with a MEMS oscillator, the navigation message could not be reliably decoded with the phase noise and/or jitter of the MEMS oscillator. Thus, some embodiments described herein use ephemeris information that is provided by another source, which can be internal or external to the GPS receiver.

When the GPS receiver is part of an integrated device, such as a cellphone or a smartphone, the ephemeris parameters can be downloaded from a WiFi network or a cellular telephony network from within the smartphone and transferred to the GPS receiver portion of the phone in an "Assisted GPS" or A-GPS like manner. However, in many embodiments, a GPS receiver will not have access to a WiFi network or a cellular telephony network. For example, a standalone GPS receiver (such as portable GPS receiver) or a GPS receiver used for projectile guidance will typically not have access to a WiFi network or to a cellular telephony network.

For these applications without access to a WiFi network or to a cellular telephony network, a different GPS receiver can be used to decode the navigation message, and the contents of the navigation message, such as at least the ephemeris parameters, can be uploaded to the GPS receiver via a wired or wireless connection. In another example, the ephemeris parameters can be downloaded from a computer network, such as the Internet. For external data transfer, a serial port, an inductive loop, an infrared transceiver, a radio frequency transmitter/receiver (such as Bluetooth, WiFi) or the like can be used to transfer the ephemeris parameters, which can be then stored in memory of the GPS receiver. These techniques permit a GPS receiver that is incapable of extracting the navigation message from the GPS signals to still be used to provide positioning information, and can make implementation of a relatively low-cost and/or high-g performing MEMS oscillator based GPS receiver practical.

Figure 2:
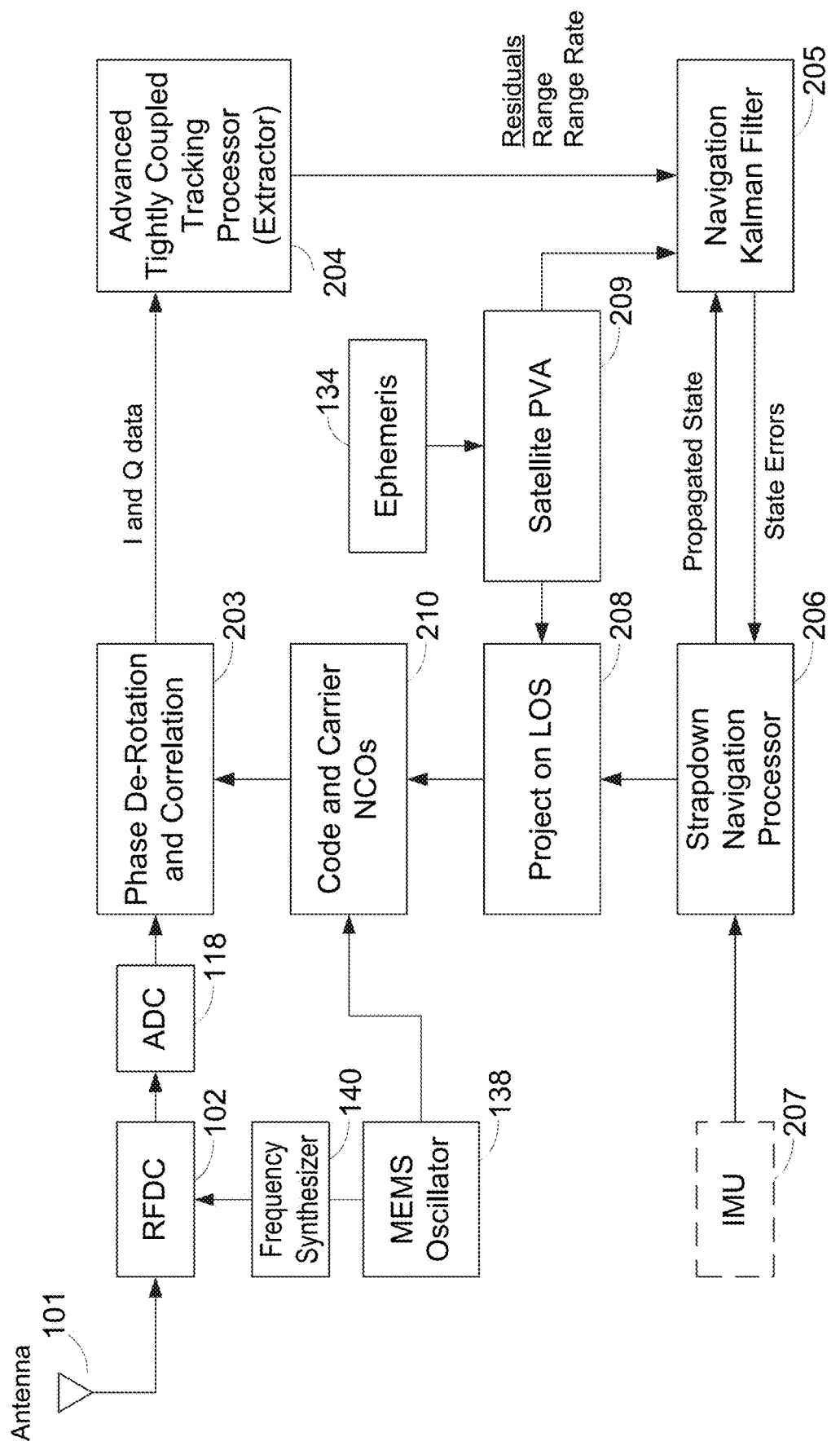
FIG. 2 is a block diagram of a system for coupling GPS and inertial navigation sensors, which can be used with a MEMS oscillator.

FIG. 2 is a block diagram of a system for coupling GPS and inertial navigation sensors, which can be used with a MEMS oscillator. The architecture illustrated in FIG. 2 can successfully acquire and track GPS signals using a MEMS oscillator. However, in certain embodiments, the ephemeris parameters 134 are provided from an external source.

These and other problems are solved by an Advanced Tightly Coupled (ATC) multi-satellite tracking system for high dynamic vehicle navigation in a high noise environment. Nonlinear transformations of I and Q tracker measurements are developed to yield linear measurements of pseudorange and delta carrier phase errors corrupted by white, additive, and unbiased noise. The system's design parameters are provided by application of linear estimation theory, allowing it to be easily integrated into existing navigation filter designs.

In one embodiment, during real-time operation, the system can handle jamming to signal interference ratios greater than 60 dB. In one embodiment, the system adapts to changing levels of interference and can operate without knowledge of the GPS navigation data bit. After initial GPS signal acquisition, it is possible to transition into the Advanced Tight Coupling mode, although standard tracking loops can still be employed at low jamming to signal ratios.

In one embodiment of the ATC multi-satellite tracking system, the navigation filter outputs vehicle trajectory estimates along with IMU and user clock error estimates. In one embodiment, a standard extended Kalman filter is used to implement the navigation filter. In a real-time system, the greater the number of filter states the less time will be available for the ATC tracking processor to function. In one embodiment, the navigation filter includes 24 states, and provides processing in less than one tenth of a second.

The navigation filter's trajectory and IMU error estimates are used by the strapdown navigation equations to correct the IMU measurements and propagate the vehicle's state between the one second navigation filter's outputs. Satellite ephemeris data, which has been obtained from the navigation message, is combined with the vehicle's position and velocity estimates to determine range and range rate estimates to each satellite. These estimates drive carrier and code numerically controlled oscillators (NCO) to generate replica carrier and code signals.

The replica signals are mixed with the GPS carrier and code signals in a phase de-rotation and correlation process to produce in-phase (I) and quadra-phase (Q) measurements. These measurements are nonlinear functions of the range measurement error and ambiguous carrier phase error. The carrier phase ambiguity refers to the unknown number of whole cycles from the satellite to the vehicle. The ATC tracking processor estimates residual measurements for the navigation filter from the I and Q data.

The I and Q measurements are functions of amplitude, navigation data bit, correlation function, and sine and cosine, respectively, of the phase error. The correlation function is a known function of the range error, and the noise on the Is and Qs is white, additive, unbiased, and Gaussian.

In one embodiment of the ATC tracking processor, the Is and Qs are first smoothed for a period of time. In one embodiment, such time period corresponds to the amount of time that the navigation data bit is expected to be constant (e.g., approximately 20 milliseconds). The smoothed Is and Qs are then passed through two nonlinear transformations configured according to their linearity and additive noise properties. Since the nonlinear transformations tend to increase the measurement noise relative to the Is and Qs, it is desirable to smooth the Is and Qs before applying the transformation.

The range residual transformation, made up of the early and late Is and Qs, produces a measurement that is a linear function of range residual error. The range rate residual transformation, made up of the prompt Is and Qs, produces a measurement that is a linear function of range rate residual error, however, the square of the correlation function remains as a multiplier. Both transformed measurements are also multiplied by the square of the I and Q amplitude. The noise on each is additive, zero mean, and white with a variance given by a deterministic equation dominated by the variance of the I and Q noise. To describe these transformed measurements and their noise statistics, the I and Q amplitude and noise variance are estimated.

The range and range rate transformed measurements, typically generated, for example, at a 20 millisecond rate, are processed in order to obtain residual error estimates at desired intervals for the navigation filter. In one embodiment, the residual error estimates are provided at approximately one second intervals. In one embodiment, a three-state phase error estimator processes the measurements. Since total phase scales to range through the carrier signal wavelength, knowledge of the phase error yields the desired residual measurements for the navigation filter.

The phase error states (phase, phase rate, and phase acceleration) are propagated assuming that the phase acceleration is constant. This results in a linear dynamic equation with a constant transition matrix. There are four measurements for each satellite, range and range rate for L1 and L2 signals. The range measurement matrix is a constant scaled by the I and Q amplitude, whereas the range rate measurement matrix is also scaled by the correlation function. Since this is a relatively slowly varying function, it is assumed constant over the one second processing interval. As previously stated, the measurement noise matrix in low signal to noise environments is dominated by the I and Q noise variance.

Given the above dynamics and measurement process, a linear, minimum variance, unbiased estimator can be realized using a Kalman filter. The primary approximation is due to the measurement noise, which is unbiased, additive, and white but not Gaussian. In one embodiment, the measurement noise variance in the filter is increased to account for this.

The constant, linear state transition and the linear, and approximately constant measurement relations, allow the phase error estimator to handle relatively large magnitude swings in the measurements in the presence of relatively high noise. It is the ability to estimate the statistics of the noise that allows the parameters in the phase error estimator to be adjusted properly.

The amplitude on the Is and Qs can rapidly change due to variations in antenna gain, radio frequency signal processing (amplifiers, mixers, filters), and the automatic gain control amplifier, which maintains a constant input to an analog to digital converter. A measurement of the amplitude can be obtained from the early and late Is and Qs, but it becomes noisy as the signal to noise ratio decreases. However, the satellite signal amplitude at the GPS antenna input is constant over a reasonable length of time.

In one embodiment, a one state, one measurement, Kalman filter is designed for the L1 and L2 signals for each satellite. The approximately constant satellite signal amplitude at the antenna is the state to be estimated. The measurements are the noisy I and Q amplitudes calculated from the early and late Is and Qs. The measurements are related to the state by the total system gain from the antenna to the analog to digital converter. The total system gain is approximately known from design parameters and can be improved in real-time by calibration and temperature compensation.

When the interference noise is low, the I and Q amplitude measurement is projected back through the system gain to estimate the constant satellite signal amplitude. Then, when the noise increases, the satellite signal amplitude estimate is projected forward through the system gain to estimate the I and Q amplitude. This process produces an approximately nonrandom multiplier for the range and range rate residual error measurements during periods of high signal interference. This helps the phase error estimator perform properly in a relatively high noise environment.

The noise variance on the Is and Qs is computed in part by assuming that each satellite's processing channel has one correlator sufficiently away from the code that it contains only noise. Since the noise is either from the radio signal processing channel or from external interference, it is the same for all satellites. However, each satellite's code is a pseudo random sequence, which when correlated with the input noise, produces uncorrelated noise between the satellites with equal variance. In one embodiment, a running average filter is used to compute the noise variance using the noise correlator signals from all satellite channels.

GPS receivers employ tracking loops to generate pseudorange and delta pseudorange measurements for each satellite. The GPS signal at the vehicle's antenna is amplified, down converted, and digitized prior to entering the tracking loops. It is a composite signal, containing information from all visible satellites.

In each satellite tracking loop, the incoming carrier signal is mixed with a replica of the carrier to produce in-phase (I) and quadrature-phase (Q) signals with a small phase error. These Is and Qs are transformed into an explicit phase error signal, integrated, subsampled, filtered and fed to a numerically controlled oscillator to generate the replica carrier signal. This process is referred to as the carrier tracking loop.

An inner loop correlates the Is and Qs with on time, one half chip early, and one half chip late replica codes for the specific satellite being tracked. The Is and Qs are now only a function of the code correlation and phase error. These are transformed into an explicit pseudorange error signal, integrated, subsampled, filtered, and fed to a numerically controlled oscillator to clock the satellite replica code. This inner loop is referred to as the code tracking loop.

A major tracking loop design tradeoff is the ability to handle high vehicle dynamics and to also track through high interfering noise. One way of solving this problem is to aid the carrier tracking loop with an Inertial Navigation Unit (IMU) and let the carrier loop aid the code loop. The IMU will remove short term dynamics from the tracking loop and thus allow the loop bandwidth to be reduced. Decreasing the bandwidth results in greater noise suppression.

In some embodiments, the output of each satellite's tracking loop includes pseudorange and delta pseudorange measurements. These, along with satellite ephemeris and IMU measurements, are provided as inputs to a navigation filter which estimates vehicle position, velocity, attitude, user clock parameters, and IMU error terms. In real-time systems, the navigation filter usually runs at a 1 Hz rate, but alternative rates can be used. The navigation filter sends estimates to the IMU strapdown navigator, which corrects the IMU specific force and angular rate measurements and then integrates them to obtain high frequency trajectory estimates. The velocity estimates are projected along each satellite's line of sight for tracking loop aiding. This configuration is called a tightly coupled system.

Standard GPS carrier and code tracking loops, with aiding from a medium grade IMU, normally break lock at jamming to signal ratios of 47 and 57 dB respectively. For high dynamic vehicles, these maximum jamming ratios can be achieved by aiding the tracking loops with IMU data as described above.

Recently, jamming to signal ratios above 60 dB have been attained by closing the tracking loops through the navigation filter. This multi-satellite tracking loop structure is derived from the maximum likelihood estimate of the pseudorange error given the composite GPS signal at the input to the tracking processor. In this configuration, position and velocity estimates from the strapdown navigator are projected along each satellite's line of sight to generate range and range rate estimates to each satellite. These drive numerically controlled oscillators whose outputs are mixed with the digitized I and Q data, processed, and input to the navigation filter as residual (measurement−estimated measurement) estimates for each satellite. The navigation filter outputs vehicle trajectory and IMU error estimates to the strapdown navigator to close the multi-satellite tracking loop.

Because every GPS satellite tracking loop includes the navigation filter, each satellite is integrated with the IMU and other tracked satellites. In this mode, the satellites aid each other, and with the IMU, generate a more robust navigation solution.

FIG. 2 is a block diagram showing multi-satellite tracking system 200 in which a MEMS oscillator 138 can be used. However, it will be understood that other GPS receiver topologies may be applicable. Advantageously, the topology illustrated in FIG. 2 can tolerate MEMS oscillators having relatively large amounts of jitter and/or phase noise. In the system 200, satellite navigation signals (radio frequency signals) are received by the antenna 101 and provided to the Radio Frequency Down Converter (RFDC) 102. A local oscillator signal can be generated by the MEMS oscillator 138 and used by the RFDC 102 to downconvert one or more radio frequency (RF) signals. The downconverted signals (intermediate frequency) from the RFDC 102 can be converted from analog to digital form by the analog-to-digital converter 118. Downconverted signals from the RFDC 102 or ADC 118 are provided to a phase de-rotation and correlation block 203.

The phase de-rotation and correlation block 203 despreads the direct sequence spread spectrum (DSSS)

signals of a GPS satellite. A replica code corresponding to either a coarse acquisition (C/A) code or to a precise (P(Y)) code is correlated with the downconverted signal using a correlator or digital matched filter. The code chips for the replica code are timed using clock signals from a code NCO of the code and carrier NCOs 210. A clock signal from the MEMS oscillator 138 can be applied as an input to a clock input of an NCO of the code and carrier NCOs 210. Acquisition and tracking loops synchronize the replica code with code carried by the received signals. The carrier NCO portion of the code and carrier NCOs can be optional and used for greater precision.

De-rotated and correlated signals from the phase de-rotation and correlation block 203 are provided to an advanced tightly coupled (ATC) tracking processor 204. The ATC tracking processor 204 provides residuals of range, range rate and range acceleration to a navigation Kalman filter 205, which can be a 24-state Kalman filter. Navigation state errors from the navigation Kalman filter 205 are provided to a strapdown navigation processor block 206. Navigation data from an Inertial Measurement Unit (IMU) 207 are provided to the strapdown navigation processor block 206. The strapdown navigation processor block 206 provides corrected navigation state information to a projection block 208 and propagated state information to the navigation Kalman filter 205. Satellite Position, Velocity, and Acceleration (PVA) data are provided from a PVA block 209 to the projection block 208 and to the navigation Kalman filter 205. The PVA block 209 can base the satellite PVA based on ephemeris parameters 134, which is ordinarily carried in the navigation message of a GPS signal and decoded from the navigation message. However, with a MEMS oscillator, the increased jitter and/or phase noise of a MEMS oscillator can render decoding of the navigation message impractical or undependable. In certain embodiments, rather than decode the ephemeris parameters from the navigation message, the contents of the navigation message are retrieved from another data source, such as a server, and loaded into the GPS receiver, such as from another satellite receiver or from data retrieved from a wireless data network, such as, but not limited to, a cellular phone network, a local area network, or a wide area network, such as the Internet. Examples of wireless networks include GSM, CDMA, LTE, Wi-Fi, and the like. The projection block 208 projects the navigation data onto the satellite line of sight and provides the projected data to a Numerically Controlled Oscillator (NCO) block 210. The NCO block 210 provides code and carrier NCO signals to the phase de-rotation and correlation block 203, thereby closing the code and carrier tracking loops.

Figure 3:
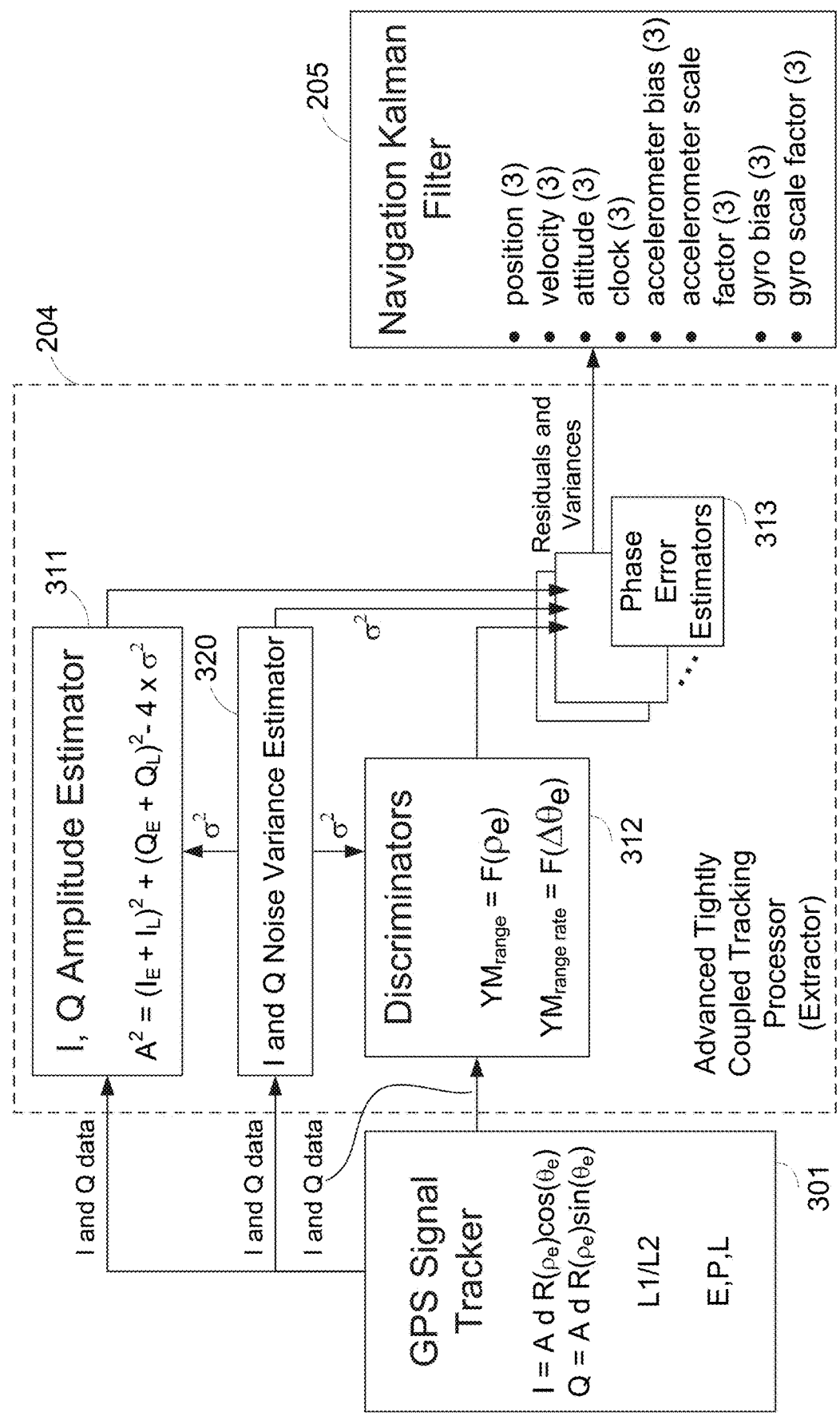
FIG. 3 is block diagram showing one embodiment of a tracking processor.

FIG. 3 is a block diagram of the ATC tracking processor 204 and also illustrates a GPS signal tracker 301 and the navigation Kalman filter 205. The illustrated ATC tracking processor 204 includes an amplitude estimator 311, one or more discriminators 312, phase error estimators 313, and a measurement noise variance estimator 320. The GPS signal tracker 301 can be part of the phase de-rotation and correlation block 203. The GPS signal tracker 301 provides early (E), on-time (P), and late (L) Is and Qs to the amplitude estimator 311. The GPS signal tracker 301 also provides data to one or more discriminators 312. The amplitude estimator 311 provides satellite signal amplitude estimates to one or more phase error estimators 313. Residuals and variances are provided to a navigation Kalman filter 205. The navigation Kalman filter 205 computes estimates for vehicle position, velocity, attitude, clock, accelerometer bias, accelerometer scale factor, gyro bias, and gyro scale factor.

In the system 200, all satellite signals and IMU measurements are combined in a single process to estimate the vehicle trajectory and associated system error parameters. This structure follows from a maximum likelihood estimator of GPS signal parameters.

The navigation Kalman filter 205 estimates vehicle position, velocity, attitude, clock and IMU error parameters and the like at a relatively low rate. In one embodiment, the navigation Kalman filter 205 provides estimates at intervals of one second. The IMU vehicle angular rate and specific force measurements are compensated and adjusted using the estimated error parameters. The measurements are then integrated by the strapdown equations in the strapdown navigation processor block 206 to obtain vehicle position, velocity, and attitude estimates at a relatively higher rate (e.g., 100 Hz).

These estimates are projected along each satellite's line of sight to obtain range and range rate estimates, which are used to drive the code and carrier NCOs 210. The carrier NCO output of the code and carrier NCOs 210 is mixed with the GPS signal phase, resulting in a phase error, $\theta_e$. The code NCOs of the code and carrier NCOs 210 drives the code generator. The generator's output is correlated with the incoming GPS code, resulting in a correlation magnitude between zero and one.

This process generates the following I and Q functions for each satellite at the relatively higher rate (e.g., at a 1 KHz rate), for prompt (P), early (E), and late (L) signals:

$$I_P = A \, d \, R(\rho_e)\cos(\theta_e) + \eta_P$$

$$Q_P = A \, d \, R(\rho_e)\sin(\theta e) + \varepsilon_P$$

$$I_E = A \, d \, R(\rho_e - b/2)\cos(\theta_e) + \eta_E$$

$$Q_E = A \, d \, R(\rho_e - b/2)\sin(\theta_e) + \varepsilon_E$$

$$I_L = A \, d \, R(\rho_e + b/2)\cos(\theta_e) + \eta_L$$

$$Q_L = A \, d \, R(\rho_e + b/2)\sin(\theta_e) + \varepsilon_L$$

where:
$R(\rho_e) = \max[1 - (|\rho_e|/b), 0]$,
b=code chip in meters (=29.3 m for P code),
A=amplitude, different for L1 and L2,
d=BPSK navigation data bit, constant for 20 ms,
$\rho_e$=residual (measurement−estimate) range error, meters,
$\theta_e$=L1 residual phase error, radians−different for L2
$\eta$, $\varepsilon$=additive, white, Gaussian noise, zero-mean, variance $\sigma_{I,Q}^2$.

The additive, white, zero-mean, Gaussian noise is assumed to be uncorrelated (approximately) between Is and Qs at the same time. The noise terms on the Is ($\varepsilon$) are assumed to be uncorrelated with the noise terms on the Qs ($\eta$) at the same instant of time. Also, because the noise on each satellite's Is and Qs is the product of the incoming RF noise and the satellite's pseudorandom code, the early and late noise terms are uncorrelated with each other but they are correlated with the prompt noise terms at a correlation coefficient equal one-half.

In the GPS signal tracker 301, the early and late Is and Qs are smoothed for a desired time period (e.g., 20 ms in one embodiment) while the data bit is assumed to be constant and assuming that $\rho_c$ and $\theta_e$ are relatively constant over that interval. The result has the same form as the above equations but with the noise variance changed to $$\sigma_{ELS} = \sigma_{IQ}/\sqrt{20}$$

In one embodiment, the prompt Is and Qs are smoothed for 10 ms each in a 20 ms interval to yield:

$I_P, Q_P, I_{PO}, Q_{PO}$ with noise variance $\sigma_{PS} = \sigma_{IQ}/\sqrt{10}$ To close the tracking loop through the navigation Kalman filter 205, the range and range rate residuals are computed by the phase error estimators 313 and provided to the navigation Kalman filter 205. In one embodiment, the estimates are provided to the navigation Kalman filter 205 at approximately 1 Hz intervals. These residuals are estimated from the smoothed Is and Qs by first transforming them into measurements of $\rho_e$ and $\Delta\theta_e$ and then applying a Kalman filter to process the measurements to obtain the 1 Hz navigation filter residual estimates.

The ATC multi-satellite tracking system can estimate the vehicle's trajectory using inertial and GPS measurements in the presence of broadband jamming noise. If the Is and Qs were directly employed as measurements to estimate residuals for the navigation filter, the phase error would render them ambiguous when it exceeded $2\pi$ radians. This corresponds to a maximum range residual of 0.19 meters (the wavelength of L1), which would easily be exceeded in the presence of any significant jamming noise. The following nonlinear transformations generate $\rho_e$ d and $\Delta\theta_e$ measurements that are not ambiguous for large tracking errors.

Range residual measurements for L1 are given by:

$$Y_R = I_E^2 + Q_E^2 - I_L^2 - Q_L^2 \quad (1)$$
$$= A^2(2\rho_e/b) + \xi \text{ for } |\rho_e| \le b/2$$

$E(\xi) = 0$ $E(\xi^2) = 8\sigma_{ELS}^4 + 4A^2 \sigma_{ELS}^2 F(\rho_e)$ $F(\rho_e) = 2\rho_e^2/b^2 + \frac{1}{2}$ \quad (2)

Since $\frac{1}{2} \le F(\rho_e) \le 1$, a relatively conservative estimate is $F(\rho_e) = 1$.

Range rate residual measurements for L1 are given by:

$Y_{RR} = I_P Q_{PO} - I_{PO} Q_P = A^2 R^2(\rho_e) \sin(\theta_{eo} - \theta_e) + \gamma$ For a small $\theta_e$ change over half an I, Q smoothing interval, $\Delta t/2$ $Y_{RR} \approx -A^2 R^2(\rho_e) \dot{\theta}_e (\Delta t/2) + \gamma$ \quad (3)

$E(\gamma) = 0$ $E(\gamma^2) = 2\sigma_{PS}^4 + 2A^2 R^2(\rho_e) \sigma_{PS}^2$ \quad (4)

for $|\rho_e| \le b/2$, $0.25 \le R^2(\rho_e) \le 1$.

A similar measurement set is generated for the GPS L2 carrier signal, resulting in a total of four measurements at each smoothing time interval.

The above measurements, $Y_R$ and $Y_{RR}$, have desirable properties relative to estimating satellite residual errors for input to the navigation filter.

In a noiseless environment:

Residual range error=true range−estimated
  range=$\rho_e = (\lambda/2\pi)\theta_e$ \quad (5)

where $\lambda$ is the L1 carrier wavelength and $\theta_e$ is the L1 carrier phase error.

Further, in the noiseless environment:

Residual range rate error=true range rate−estimated
  range rate=$\dot{\rho}_e = (\lambda/2\pi)\dot{\theta}_e$ \quad (6)

The measurements $Y_R$ and $Y_{RR}$ are linear in $\rho_e$ and $\dot{\theta}_e$ respectively with coefficients that are functions of the I and Q amplitude, A. The dependence of $Y_{RR}$ on $R(\rho_e)$ is discussed below. The measurement noise terms, $\xi$ and $\gamma$, are additive, unbiased, and white. They are uncorrelated with each other even though some of the noise terms which make up $\xi$ and $\gamma$ are correlated. Although they are non-gaussian, they can still be processed with a Kalman filter by slightly increasing the noise standard deviation.

The negative aspect of the nonlinear measurement transformations is that they significantly increase the measurement noise. For this reason, it is desirable to smooth the Is and Qs before they are transformed. The GPS navigation data bit rate of 50 Hz limits the smoothing interval to 20 ms for GPS systems.

When broadband jamming noise is present, the I and Q amplitude, A, can be relatively accurately estimated by an offline process. If the navigation filter could be run at 50 Hz instead of 1 Hz, then solving equations (1), (3) and (6) for $\rho_e$ and $\dot{\rho}_e$ yields residual error estimates that could be directly input to the navigation filter with appropriately modified measurement noise variances given by equations (2) and (4). The navigation filter's previous estimate of $\rho_e$ can be used to determine $R(\rho_e)$ in equations (3) and (4).

When the navigation filter is run at 1 Hz, which is its normal rate in an embedded processor, the 1 Hz measurement residuals are typically estimated from the 50 Hz measurements given by equations (1) and (3). This estimation can be performed by a Kalman filter which employs a relatively constant phase error acceleration model for its dynamics.

The L1 phase error estimator has states:

$X = [\theta_e \dot{\theta}_e \ddot{\theta}_e]^T$ where:
  $\theta_e$ = measured phase−navigation estimated phase for the GPS L1 frequency.

The state model is:

$\dddot{\theta}_e$ = constant

The dynamics equation is therefore:

$X(t_i) = F \cdot X(t_{i-1})$ where:
  F=Identity(3,3) and
  $F(1,2) = F(2,3) = \Delta t$  $F(1,3) = \Delta t_2/2$
  $\Delta t = t_i - t_{i-1}$ Since both L1 and L2 signals are assumed available, ionospheric error and error rate terms can be added to the state vector, $X_e$. These errors are observable because of the sign reversal in the code and carrier phase measurements. However, in a high jamming environment, ionospheric errors typically cannot easily be separated from the total phase measurements during this filter's one second processing time.

The measurement vector is given by:

$Y(t_i) = [Y_R(f_1) Y_{RR}(f_1) Y_R(f_2) Y_{RR}(f_2)]^T$ where:
  $Y_R$ and $Y_{RR}$ are defined by equations (1) and (3), and
  $f_1$ and $f_2$ represent GPS L1 (1575.42 MHz) and L2 (1227.6 MHz).

The measurement equation is:

$Y(t_i) = H \cdot X(t_i) + \Gamma(t_i)$ where:
  $\Gamma(t_i) = [\xi_1 \gamma_1 \xi_2 \gamma_2]^T$, the first and second noise pairs correspond to L1 and L2, $H$=Zeros(4,3), and $H(1,1)=(2A_1^2/b) \cdot (\lambda/2\pi)$, $H(2,2)=-A_1^2 R^2(\hat{\rho}_e) \cdot \Delta t/2$ $H(3,1)=(2A_2^2/b) \cdot (\lambda/2\pi)$ $H(4,2)=-A_2^2 R^2(\hat{\rho}_e) \cdot \Delta t/2 \cdot (f_2/f_1)$, $A^1$ and $A_2$ correspond to I and Q amplitudes for L1 and L2 channels respectively, and $\hat{\rho}_e$ represents the present best estimate of $\rho_e$.

The measurement noise variance is given by $R(t_i)=E(\Gamma\Gamma^T)$ where:
R is diagonal since the noise terms are not correlated with each other,
R(1,1), R(3,3)=equation (2) for L1 and L2 respectively, and
R(2,2), R(4,4)=equation (4) for L1 and L2 respectively.

To completely determine the measurement process, the following values are estimated in blocks 311 and 320 as described below.

$\sigma_{IQ}^2$=variance of the additive noise on the Is and Qs (block 320)

$A_1$ and $A_2$=I and Q amplitudes for L1 and L2 (block 311)

The ATC tracking processor 204 includes nonlinear discriminators 312 which transform I and Q data into linear residual measurements corrupted by unbiased, additive, and white noise. It also includes an amplitude estimator 311 configured to operate in rapidly changing, high power noise; a measurement noise variance estimator 320; and a linear residual smoothing filter (GPS signal tracker) 301 for input to the navigation Kalman filter 205.

The operation of the phase error estimator for each satellite is described in the following paragraphs.

At discrete time intervals (e.g., one second intervals in one embodiment), the navigation filter generates new estimates of the vehicle trajectory and IMU errors, which through the strapdown equations, run each of the satellite's NCOs. This causes the phase error states defined above to change. Therefore, the phase error estimator must be reinitialized after each navigation filter cycle.

The best estimate of the initial phase error states is zero. Thus:

$\overline{X}_{(t_0)}=[0\ 0\ 0]^T$

The initial covariance matrix (diagonal), is determined by the maximum expected phase, phase rate, and phase acceleration errors at start of each one second interval.

$\overline{P}_{(t_0)}=E(\overline{X}_{(t_0)} \overline{X}_{(t_0)}^T)$

After initialization, the measurements are processed at time $t_i$, i=0, . . . , 49 (number of 20 ms measurements in a one second interval).

The estimated measurement vector is given by:

$\overline{Y}(\overline{t}_i)=H \cdot \overline{X}_{(t_i)}$

Before processing, each measurement is tested using the following algorithm, where $k_{res}$ is an input parameter usually between three and ten.

$E_{res}$=sqrt[diag($H \cdot \overline{P}\ P \cdot H^T+R$]

for $i$=1, 4 if $|Y(t_i)-\overline{Y}(t_i)| \geq k_{res} \cdot E_{rers}$

H(i,1:2)=0 Do not process the $i^{th}$ measurement end end

All measurements passing the above test, H(i,i)≠0, are processed by the following filter equations:

$K(t_i)=P(\overline{t}_i) \cdot H^T \cdot [H \cdot \overline{P}(t_i) \cdot H^T+R]^{-1}$ Kalman filter gain matrix $\hat{X}(t_i)=\overline{X}(\overline{t}_i)+K(t_i) \cdot [Y(t_i)-\overline{Y}(\overline{t}_i)]$ Generate new estimates $\hat{P}(t_i)=[I-K(t_i) \cdot H] \cdot \overline{P}(\overline{t}_i)$ Update Error Covariance matrix In the above equation, I is the identity matrix.

The system then checks for the end of the one second estimator processing interval as follows:

If $t_i$<1 second

Update estimate and covariance to next processing time $\overline{X}(\overline{t}_{i+1})=F \cdot \hat{X}(t_i)$ $\overline{P}_{(t_{i+1})}=F \cdot P(\hat{t}_i) \cdot F^T+Q$ Q (3×3)—represents state noise (usually set to zero to assure maximum smoothing of the measurement noise.

$i=i+1$

Process the next measurement

If $t_i$=one second, then for each satellite, generate range and range rate residual measurements and accuracies for input to the navigation filter as follows:

$DR=(\lambda/2\pi) \cdot \hat{X}(1)$, $\sigma_{DR}^2=(\lambda/2\pi)^2 \cdot \hat{P}(1,1)$ $DRR=(\lambda/2\pi) \cdot \hat{X}(2)$, $\sigma_{DRR}^2=(\lambda/2\pi)^2 \cdot \hat{P}(2,2)$ It is not necessary to account for the correlation between $\hat{X}(1)$ and $\hat{X}(2)$ because it is almost always less than 0.2

In one embodiment, each phase error estimator 313 is restarted after the navigation Kalman filter 205 has completed processing. There is some data loss with this process. Since the navigation Kalman filter 205 takes some finite time to run, the phase error estimators 313 have to operate in what remains of the one second interval after the navigation Kalman filter 205 has stopped. Also, since the satellite signals 20 ms data bit boundaries do not arrive at the same time, not all of the phase error estimators 313 complete their last 20 ms processing before the navigation Kalman filter 205 is ready to receive the inputs from the estimators 313.

In order to completely define the measurements and their associated accuracies given by equations (1) through (4), it is useful to compute an estimate of the I and Q amplitudes and noise variance. The amplitude squared measurement in the amplitude estimator 311 is given by $A_M^2=(I_E+I_L)^2+(Q_E+Q_L)^2-4 \cdot \sigma_{ELS}^2=A^2+\beta$ for $|\rho_e|b/2$ where $E(\beta)=0$ $E(\beta^2)=\sigma_{AM}^2=8 \cdot \sigma_{ELS}(2 \cdot \sigma_{ELS}^2+A^2)$ When there are no significant signals interfering, either intentionally or unintentionally, with the GPS signal, the noise variance, $\sigma_{ELS}^2$, is relatively low and a relatively good estimate of the amplitude can be made by smoothing $A_M^2$ over relatively short periods of time. However, broadband signal interference will increase the noise and, through the automatic gain control (AGC) amplifier, cause variations in the amplitude. Smoothing the measurement in this situation is typically not a viable option. The increased noise requires longer smoothing times but the amplitude variations limit smoothing times. One way to get around this situation is to identify something in the process that is relatively constant so that long term smoothing can be used.

It is assumed that for most of the visible satellites, the satellite signal amplitude at the GPS antenna remains relatively constant during periods of broadband jamming. If the antenna and RF chain are calibrated and temperature compensated, the gain from the input to the GPS antenna through the RF chain (amplifiers, bandpass filters, mixers, AGC amplifier) will be known to within several dB. A one-state Kalman estimator for the GPS L1 frequency can be configured as follows:

State:
$a^2$=satellite signal amplitude squared, assumed constant
State Model:

$$a_{i+1}^2 = a_i^2 + q_i \; E(q)=0, \; E(q_i^2)=QE_i$$

The state noise with variance, QE, is included to account for some variations in satellite signal amplitudes as the vehicle moves and satellite orbits change. It can also be used to account for some unknown gain variations in the antenna and RF chain.

The amplitude squared measurement is expressed as $$A_M^2 = A_{i+1}^2 + \beta_{i+1}$$
$$= G_{i+1}^2 \cdot a_{i+1}^2 + \beta_{i+1}$$
$$E(\beta_{i+1}^2) = \sigma_{AM}^2 = RE_{i+1}$$

where G is the total gain from the GPS antenna, through the RF chain, to I and Q generation. Typically G is known to less than 2 dB.

In one embodiment, the amplitude estimator 311 runs concurrently with the phase error estimator 313, but it is not reinitialized at one second intervals. Measurements are processed at 20 ms time intervals.

The initial measurement is used to generate the first estimate, which must be in low noise.

$$\overline{a^2}(t_i) = A_M^2/G_i^2$$

The initial covariance is given by:

$$\overline{PE}(t_i) = RE_i/G_i^4$$

The Kalman filter gain matrix is given by:

$$KE(t_i) = \overline{P}E(t_i) \cdot G_i^2 \cdot [\overline{P}E(t_i) \cdot G_i^4 + RE_i]^{-1}$$

The new estimate is computed from:

$$\hat{a}^2(t_i) = \overline{a^2}(t_i) + KE(t_i) \cdot [A_M(t_i) - G_i^2 \cdot \overline{a^2}(t_i)]$$

The new error covariance matrix is given by:

$$\hat{P}E(t_i d) = [1 - KE(t_i) \cdot G_i^2] \cdot P\overline{E}(t_i)$$

The updated estimate and covariance at the next processing time is:

$$\overline{a^2}(t_{i+1}) = \hat{a}^2(t_i)$$

$$\overline{P}E(t_{i+1}) = \hat{P}E(t_i) + +QE_i$$

The amplitude estimator 311 continues processing measurements at each 20 ms timing cycle. A separate estimator is required for each satellite L1 and L2 signal.

The amplitude estimator 311 handles broadband interference noise. During periods of low noise, the amplitude measurement is projected back through the system gain to estimate the satellite signal amplitude. Then when the interference noise increases, the estimated satellite signal amplitude is projected forward through the system gain to estimate the I and Q amplitude. In this situation, the noisy I and Q amplitude measurement is smoothed using the constant satellite amplitude projected through the system gain.

GPS receivers typically have at least three correlators per satellite (early, prompt, and late) to aid in tracking each satellite's code. It is assumed that one additional correlator is available for I and Q noise estimation. In this correlator, the GPS signals are multiplied by the satellite's reference code which is offset by a significant time difference from the actual signal code. The correlator, therefore, outputs primarily noise.

Since all satellite signals at a specified frequency arrive at the correlators through the same, or similar, RF channel, their composite signal is corrupted by a single additive noise term. But because each satellite code is a different pseudorandom noise sequence, the correlation process causes the resulting I and Q noise sequences for different satellite channels to be approximately uncorrelated. Therefore, the I and Q noise variance can be estimated by averaging over time and across several satellite channels.

The noise is assumed to be zero mean, white, and Gaussian. Thus the only parameter to be estimated is the variance.

At time $t_j$ the I and Q noise variance computed from M satellite channels is $$\sigma_{IQ}^2(t_j) = (1/M) \sum_{i=1}^{M} (\eta^2(i,j) + \varepsilon^2(i,j))$$

where
$\eta(i,j)$, $\varepsilon(i,j)$ represents noise on the Is and Qs for the $i^{th}$ satellite at time $t_j$.

The noise estimate over N time points is $$\sigma_{IQ}^2 = (1/N) \sum_{j=1}^{N} \sigma_{IQ}^2(t_j)$$

A running average filter that approximates the above is $$\sigma_{IQ}^2 = \alpha \cdot \sigma_{IQ}^2 + (1-\alpha) \cdot \sigma_{IQ}^2(t_j) \text{ where } (1-\alpha)=1/N$$

The smoothing parameter, a, can be adjusted depending on the expected dynamics of the I and Q additive noise.

In one embodiment, the linearity of the discriminator measurements and the smoothing filter, and the configuration of the amplitude estimator allow the ATC to handle relatively large magnitude swings in the measurements due to noise. In one embodiment, the ATC can estimate the statistics of the noise that allows the parameters in the ATC to be adjusted properly. The system adapts to changing levels of interference and can operate without knowledge of the GPS navigation data bit. Since its design parameters are provided by application of linear estimation theory, the ATC can easily be integrated into existing navigation filter designs.

Figure 4:
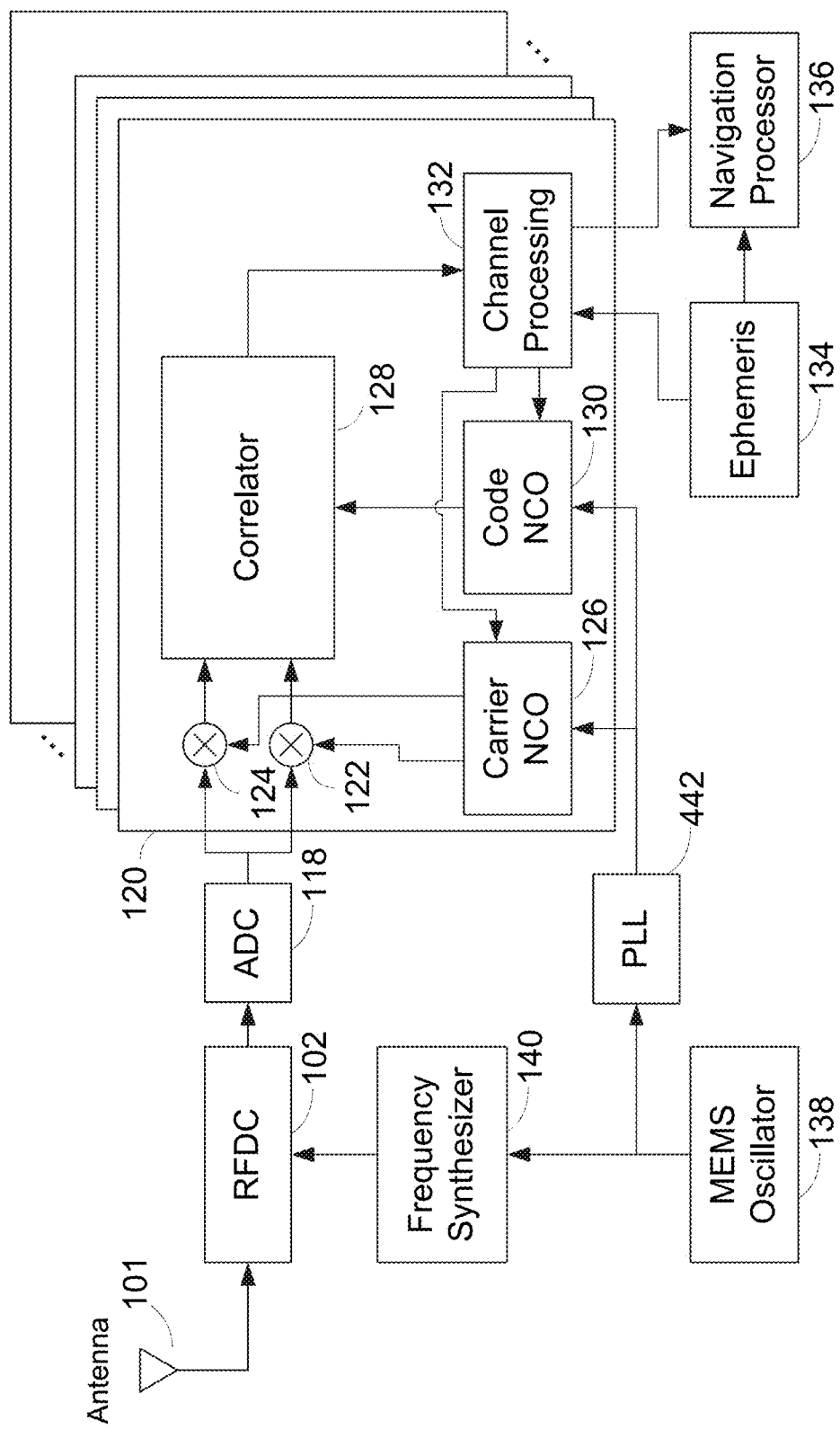
FIG. 4 illustrates an example of a GPS receiver with a MEMS oscillator that is stabilized with respect to jitter via a phase-locked loop.

FIG. 4 illustrates an example of a GPS receiver with a MEMS oscillator 138 that is stabilized with respect to jitter via a phase-locked loop (PLL) 442. Not all PLL circuits will function as jitter cleaners. To perform jitter cleaning, the loop bandwidth of the PLL 442 should be lower than the bandwidth of the phase noise of the MEMS oscillator 138. The jitter reducing principles of the PLL 442 can also optionally be applied to a PLL within the frequency synthesizer 140. To avoid repetition of description, components having the same or similar function in FIG. 4 may be referenced by the same reference number as those in FIG. 1.

As previously discussed, one disadvantage of the use of the MEMS oscillator 138 is that the jitter characteristics can be relatively worse as compared to a crystal oscillator. Advantageously, with the phase noise of the MEMS oscillator 138 favorably reduced via the PLL 442, the GPS receiver can use traditional GPS receiver topologies for the plurality of channel signal processors 120 and achieve operation in at least one of operating states 3 or 5.

Jitter cleaner circuits are well known by those of ordinary skill in the art. The PLL 442 for the jitter cleaner circuit can correspond to a relatively narrow-band PLL that receives the relatively noisy clock signal from the MEMS oscillator 138 as an input, and generates a cleaner clock signal as an output by effectively filtering the phase noise by having a relatively low loop bandwidth.

The jitter cleaner PLL 442 can correspond to a commercially available jitter cleaner or clock conditioner or to a proprietary design. Examples of commercially available jitter cleaner circuits include the Si5338 chip from Silicon Labs, the CDCl7005 chip from Texas Instruments, the LMK04800 clock conditioner from National Semiconductor, and the like.

With the jitter cleaner PLL 442, the relatively noisy clock signal from the MEMS oscillator 138 can be cleaned up sufficiently to permit successful decoding of the navigation message from GPS signals, that is, permits operation in state 5. This permits the GPS receiver to operate in a standalone manner.

Figure 5:
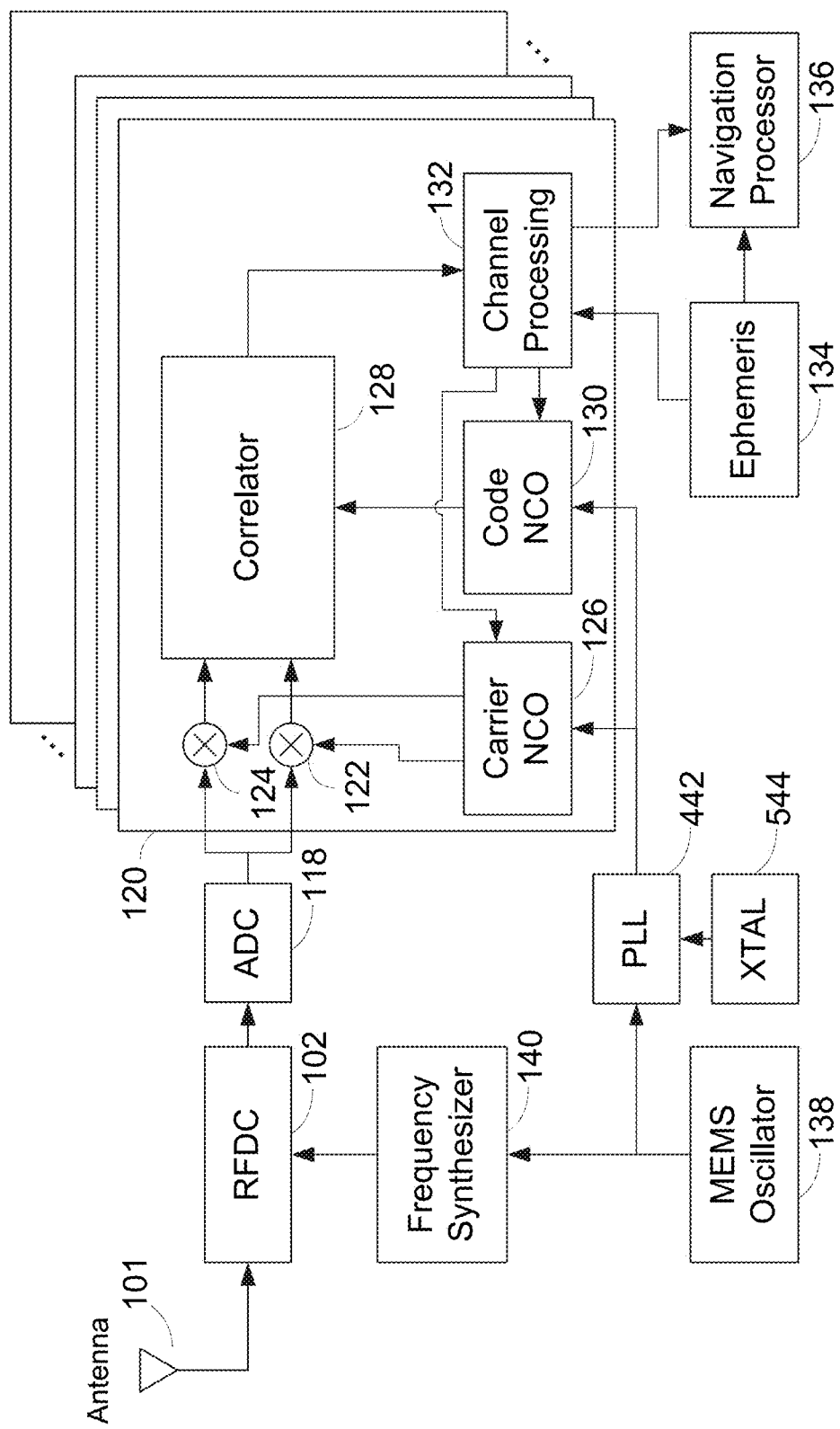
FIG. 5 illustrates an example of a GPS receiver with a MEMS oscillator that is stabilized with respect to jitter via a phase-locked loop equipped with a tunable crystal oscillator.

FIG. 5 illustrates an example of a GPS receiver with a MEMS oscillator that is stabilized with respect to jitter via a phase-locked loop equipped with a tunable crystal oscillator (XTAL). In FIG. 5, the MEMS oscillator 138 is combined with the tunable crystal oscillator (XTAL) 544 and the PLL 442 to combine the benefits of both types of oscillators. The PLL 442 uses the lower jitter clock signal from the XTAL 544 to stabilize the clock signal from the MEMS oscillator 138. Due to the relatively good temperature stability characteristics of the MEMS oscillator 138, the tunable crystal oscillator (XTAL) 544 used for jitter cleaning can be a voltage-controlled crystal oscillator and, as a result, can be much cheaper than the typical crystal oscillators conventionally used in a GPS receivers, which can correspond to relatively expensive temperature-compensated crystal oscillators (TCXO), oven-controlled crystal oscillator (OCXO), and the like. While illustrated in connection with crystal oscillators, in alternative embodiments, other oscillators can be used.

With the PLL 442, the desirable characteristics of a MEMS oscillator, such as relatively low cost, relatively good long-term stability, relatively good temperature coefficient characteristics, and relatively good g-force stability can be paired with the relatively low-noise characteristics of a relatively inexpensive crystal oscillator at a relatively low cost.

Devices employing the above described schemes can be implemented into various electronic devices. Examples of the electronic devices can include, but are not limited to, consumer electronic products, parts of the consumer electronic products, electronic test equipment, etc. The consumer electronic products can include, but are not limited to, an automobile, a camcorder, a camera, a digital camera, a portable memory chip, smart phone, cell phone, a navigation device, etc. Further, the electronic device can include unfinished products, including those for industrial, medical, and automotive applications.

Various embodiments have been described above. Although described with reference to these specific embodiments, the descriptions are intended to be illustrative and are not intended to be limiting. Various modifications and applications may occur to those skilled in the art.

What is claimed is:

1. An apparatus comprising a global positioning satellite (GPS) receiver, the apparatus comprising:
   a microelectromechanical systems (MEMS) oscillator configured to generate a first clock signal as an output, the first clock signal having a phase noise with a first bandwidth;
   a phase-locked loop that has
   a bandwidth lower than the first bandwidth of the phase noise of the MEMS oscillator;
   the phase-locked loop configured to:
   receive the first clock signal from the MEMS oscillator as an input; and
   generate an NCO clock signal that has less phase noise relative to the phase noise of first clock signal; and
   a plurality of channel signal processors configured to despread GPS signals and configured to generate pseudo-range estimates to space vehicles, wherein a channel signal processor of the plurality of channel signal processors comprises at least one numerically controlled oscillator (NCO), wherein the at least one NCO is configured to receive the NCO clock signal that has less phase noise relative to the phase noise of first clock signal;
   wherein one or more channel signal processors of the plurality of channel signal processors further comprise an extractor configured to extract vehicle range and carrier phase residual errors, the extractor comprising a discriminator configured to compute at least two non-linear transformations to generate linear measurements of pseudorange and carrier phase errors, wherein the extractor further comprises an I and Q Noise Variance Estimator further comprising a running average filter configured to compute the I and Q noise variance using a separate outbound correlator channel for respective satellites that is sufficiently away from code that it contains substantially random noise; and
   a navigation processor configured to extract at least position information based at least on the plurality of pseudo-range estimates.

2. The apparatus of claim 1, wherein a voltage controlled oscillator of the phase locked loop comprises a tunable crystal oscillator.

3. The apparatus of claim 1, wherein the GPS receiver is integrated with a mobile phone, and wherein the plurality of channel signal processors and the navigation processor are configured to receive ephemeris information originating from a cellular network.

4. The apparatus of claim 1, wherein the GPS receiver is integrated with a mobile phone, and wherein the plurality of channel signal processors and the navigation processor are configured to receive ephemeris information originating from a wide area network.

5. The apparatus of claim 1, wherein the plurality of channel signal processors and the navigation processor are configured to retrieve ephemeris information from a data store, wherein the data store is populated with ephemeris information originating from a source external to the apparatus.

6. The apparatus of claim 1, wherein one or more channel signal processors of the plurality of channel signal processors further comprises an advanced tight coupling (ATC) tracking processor configured to calculate and provide at least range, range rate, and range acceleration residuals to a navigation Kalman filter.

7. The apparatus of claim 1, wherein one or more channel signal processors of the plurality of channel signal processors further comprise an extractor configured to extract vehicle range and carrier phase residual errors, the extractor comprising a discriminator configured to compute at least two nonlinear transformations to generate linear measurements of pseudorange and carrier phase errors.

8. The apparatus of claim 1, wherein one or more channel signal processors of the plurality of channel signal processors further comprise an extractor configured to extract vehicle range and carrier phase residual errors, the extractor comprising a discriminator configured to compute at least two nonlinear transformations to generate linear measurements of pseudorange and carrier phase errors, wherein the extractor is configured to extract vehicle range and carrier phase residual errors in the presence of interference signals, wherein the extractor comprises a linear estimator.

9. The apparatus of claim 1, wherein one or more channel signal processors of the plurality of channel signal processors further comprise an extractor configured to extract vehicle range and carrier phase residual errors, the extractor comprising a discriminator configured to compute at least two nonlinear transformations to generate linear measurements of pseudorange and carrier phase errors, wherein the extractor further comprises respective tracking processors for respective satellites, wherein a given tracking processor accepts early, late, and on-time I and Q data from the GPS signal tracker and outputs vehicle to satellite range and/or range rate residual measurements to a navigation Kalman filter, wherein the tracking processor comprises:
- at least one amplitude estimator to accept I and Q data and output estimates of the I and Q amplitudes for L1 and L2 signals;
- at least one discriminator to transform I and Q data into measurements of satellite range and carrier phase error residuals; and
- at least one phase error estimator to process discriminator measurements for input to the navigation Kalman filter.

10. The apparatus of claim 1, wherein one or more channel signal processors of the plurality of channel signal processors further comprise an extractor configured to extract vehicle range and carrier phase residual errors, the extractor comprising a discriminator configured to compute at least two nonlinear transformations to generate linear measurements of pseudorange and carrier phase errors, wherein the extractor further comprises respective tracking processors for respective satellites, wherein a given tracking processor accepts early, late, and on-time I and Q data from the GPS signal tracker and outputs vehicle to satellite range and/or range rate residual measurements to a navigation Kalman filter, wherein the tracking processor comprises:
- at least one amplitude estimator to accept I and Q data and output estimates of the I and Q amplitudes for L1 and L2 signals;
- at least one discriminator to transform I and Q data into measurements of satellite range and carrier phase error residuals; and
- at least one phase error estimator to process discriminator measurements for input to the navigation Kalman filter,
wherein the tracking processor is configured to filter the Is and Qs for a period of time corresponding to an amount of time that a navigation data bit is expected to be constant.

11. The apparatus of claim 1, wherein one or more channel signal processors of the plurality of channel signal processors further comprise an extractor configured to extract vehicle range and carrier phase residual errors, the extractor comprising a discriminator configured to compute at least two nonlinear transformations to generate linear measurements of pseudorange and carrier phase errors, wherein the extractor further comprises respective tracking processors for respective satellites, wherein a given tracking processor accepts early, late, and on-time I and Q data from the GPS signal tracker and outputs vehicle to satellite range and/or range rate residual measurements to a navigation Kalman filter, wherein the tracking processor comprises:
- at least one amplitude estimator to accept I and Q data and output estimates of the I and Q amplitudes for L1 and L2 signals;
- at least one discriminator to transform I and Q data into measurements of satellite range and carrier phase error residuals; and
- at least one phase error estimator to process discriminator measurements for input to the navigation Kalman filter,
wherein the filtered Is and Qs signals are provided to one or more nonlinear transformations configured according to their linearity and additive noise properties, comprising:
- a range residual transformation, made up of the early and late Is and Qs to produce a measurement that is a linear function of range residual error;
- a range rate residual transformation, made up of the prompt Is and Qs, to produce a measurement that is a linear function of range rate residual error with the square of the correlation function remaining as a multiplier; and
- an estimator of the I and Q amplitude and noise variance to define the transformed measurements and their noise statistics, wherein the noise on each discriminator is substantially additive, substantially zero mean, and substantially white with a variance given by a deterministic equation dominated by the variance of the I and Q noise.

12. The apparatus of claim 1, wherein one or more channel signal processors of the plurality of channel signal processors further comprise an extractor configured to extract vehicle range and carrier phase residual errors, the extractor comprising a discriminator configured to compute at least two nonlinear transformations to generate linear measurements of pseudorange and carrier phase errors, wherein the extractor further comprises respective tracking processors for respective satellites, wherein a given tracking processor accepts early, late, and on-time I and Q data from the GPS signal tracker and outputs vehicle to satellite range and/or range rate residual measurements to a navigation Kalman filter, wherein the tracking processor comprises:
- at least one amplitude estimator to accept I and Q data and output estimates of the I and Q amplitudes for L1 and L2 signals;
- at least one discriminator to transform I and Q data into measurements of satellite range and carrier phase error residuals; and
- at least one phase error estimator to process discriminator measurements for input to the navigation Kalman filter, wherein the at least one phase error estimator comprises a three-state phase error estimator configured to process the range and range rate transformed measurements are processed in order to obtain residual error estimates at approximately one second intervals for the navigation Kalman filter.

13. The apparatus of claim 1, wherein one or more channel signal processors of the plurality of channel signal processors further comprise an extractor configured to extract vehicle range and carrier phase residual errors, the extractor comprising a discriminator configured to compute at least two nonlinear transformations to generate linear measurements of pseudorange and carrier phase errors, wherein the extractor further comprises respective tracking processors for respective satellites, wherein a given tracking processor accepts early, late, and on-time I and Q data from the GPS signal tracker and outputs vehicle to satellite range and/or range rate residual measurements to a navigation Kalman filter, wherein the tracking processor comprises:
 at least one amplitude estimator to accept I and Q data and output estimates of the I and Q amplitudes for L1 and L2 signals;
 at least one discriminator to transform I and Q data into measurements of satellite range and carrier phase error residuals; and
 at least one phase error estimator to process discriminator measurements for input to the navigation Kalman filter, wherein the at least one phase error estimator comprises a three-state phase error estimator configured to process the range and range rate transformed measurements are processed in order to obtain residual error estimates at approximately one second intervals for the navigation Kalman filter,
 wherein the three-state phase error estimator comprises a Kalman filter comprising three phase error states (L1 phase, phase rate, and phase acceleration), which are propagated assuming that the phase acceleration is constant; a linear dynamics equation with a constant transition matrix; four measurements for respective satellites; range and range rate for L1 and L2 signals with measurement noise that is substantially unbiased; a measurement noise matrix dominated by the I and Q noise variance in low signal to noise environments; and a measurement noise filter input variance increased to account for non-gaussian measurement noise.

14. The apparatus of claim 1, wherein one or more channel signal processors of the plurality of channel signal processors further comprises an extractor configured to extract vehicle range and carrier phase residual errors, the extractor comprising a discriminator configured to compute at least two nonlinear transformations to generate linear measurements of pseudorange and carrier phase errors, wherein the extractor further comprises an amplitude estimator configured to produce a nonrandom multiplier for the range and range rate residual error measurements during periods of high signal interference, which helps the phase error estimator perform properly in a high noise environment as follows:
 when the interference noise is low, the I and Q amplitude measurement is projected back through a system gain to estimate the constant satellite signal amplitude and
 when the noise increases, the satellite signal amplitude estimate is projected forward through the system gain to estimate the I and Q amplitude.

15. The apparatus of claim 1, wherein one or more channel signal processors of the plurality of channel signal processors further comprises an extractor configured to extract vehicle range and carrier phase residual errors, the extractor comprising a discriminator configured to compute at least two nonlinear transformations to generate linear measurements of pseudorange and carrier phase errors, wherein the extractor further comprises an I and Q Noise Variance Estimator further comprising a running average filter configured to compute a sample variance of noise in one or more outbound satellite correlator channels.

16. The apparatus of claim 1, wherein one or more channel signal processors of the plurality of channel signal processors further comprises an extractor configured to extract vehicle range and carrier phase residual errors, the extractor comprising a discriminator configured to compute at least two nonlinear transformations to generate linear measurements of pseudorange and carrier phase errors, wherein the extractor further comprises an amplitude estimator configured to use an approximately-constant satellite signal amplitude at the antenna as the state to be estimated.

17. The apparatus of claim 1, wherein one or more channel signal processors of the plurality of channel signal processors is further configured to adapt to changing levels of interference without knowledge of a GPS navigation data bit.

18. An apparatus comprising a global positioning satellite (GPS) receiver, the apparatus comprising:
 a microelectromechanical systems (MEMS) oscillator configured to generate a first clock signal as an output, the first clock signal having a phase noise with a first bandwidth;
 a phase-locked loop that has a bandwidth lower than the first bandwidth of the phase noise of the MEMS oscillator;
 the phase-locked loop configured to:
  receive the first clock signal from the MEMS oscillator as an input; and
  generate an NCO clock signal that has less phase noise relative to the phase noise of first clock signal; and
 a plurality of channel signal processors configured to despread GPS signals and configured to generate pseudo-range estimates to space vehicles, wherein a channel signal processor of the plurality of channel signal processors comprises at least one numerically controlled oscillator (NCO), wherein the at least one NCO is configured to receive the NCO clock signal that has less phase noise relative to the phase noise of first clock signal;
 a navigation processor configured to extract at least position information based at least on the plurality of pseudo-range estimates;
 a strapdown inertial measurement unit (IMU);
 a navigation Kalman filter configured to process vehicle range and carrier phase residual signals to generate vehicle position, velocity, attitude, and time estimates along with IMU error estimates;
 a strapdown navigation processor configured to integrate the IMU measurements between the navigation Kalman filter processing intervals, wherein the strapdown navigation processor is configured to receive navigation state error estimates from the navigation Kalman filter, and wherein the strapdown navigation processor is configured to receive navigation data from the IMU; and
 a satellite navigation message decoder configured to provide satellite position, velocity, and acceleration (PVA) data to a processor-implemented satellite line of sight projection estimator and to the navigation Kalman filter;

wherein the processor-implemented satellite line of sight projection estimator to project navigation data onto the satellite line of sight, generate range and range rate measurements, and provide these measurements to one or more Numerically Controlled Oscillators configured to provide code and carrier signals for GPS signal phase de-rotation and correlation.

\* \* \* \* \*